May 4, 1943.  F. NALLINGER  2,318,328
MULTIPLE MOTOR DRIVING MECHANISM PARTICULARLY
FOR AIR PROPELLER SHAFTS
Filed Nov. 4, 1939

Fritz Nallinger
INVENTOR

BY
his ATTORNEY.

Patented May 4, 1943

2,318,328

UNITED STATES PATENT OFFICE 2,318,328

MULTIPLE MOTOR DRIVING MECHANISM, PARTICULARLY FOR AIR PROPELLER SHAFTS

Fritz Nallinger, Stuttgart, Germany; vested in the Alien Property Custodian

Application November 4, 1939, Serial No. 302,868
In Germany October 18, 1938

3 Claims. (Cl. 192—47)

The invention relates to the driving of a shaft by more than one motor, particularly for air propellers, wherein the driving of a shaft is continued by the other motors, when one or more of the motors drop out.

The invention consists in mounting, between the mechanism for driving the common shaft and each separate motor, a coupling device capable of being, for instance manually, adjusted to several different working positions, each said device automatically uncoupling, in one adjusted position, its associated motor from the common driven shaft upon occurrence of an output decrease as a result of ignition troubles, defective fuel supply or the like, while, in another adjusted position of each said device, automatic uncoupling is effected only in case of serious disturbances, as for instance fracture or corrosion. In each case, the remaining motors continue to drive the shaft.

Such an arrangement enables the person controlling the driving mechanism, when the output of the driving set decreases, to find immediately the motor wherein the disturbance occurs, and to stop this motor without stopping the common driven shaft, after which the disturbance can be removed and the motor be put in action again.

Figure 1:
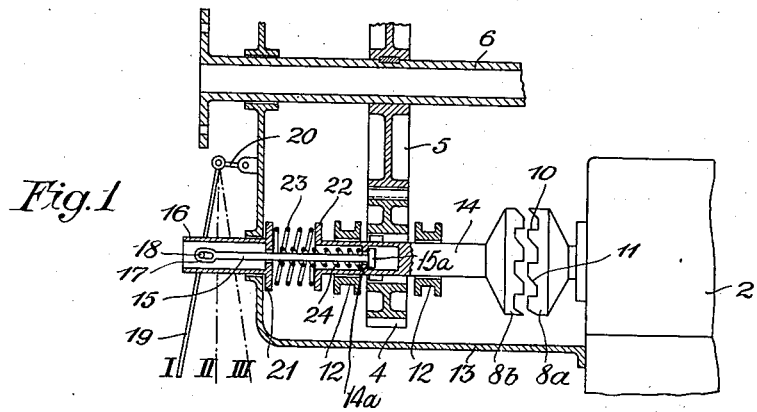
Figure 2:
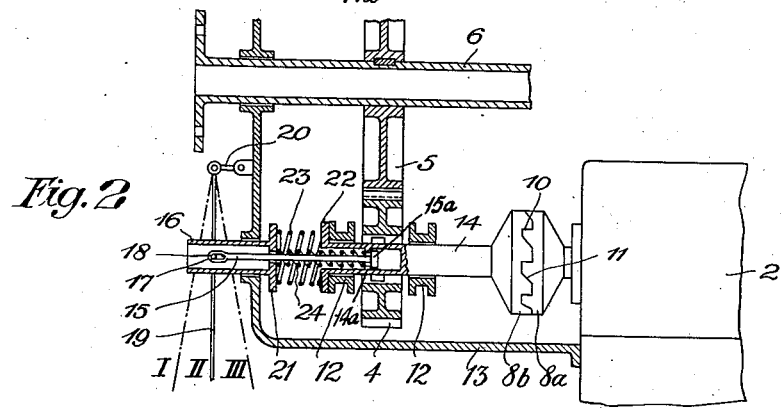
Figure 3:
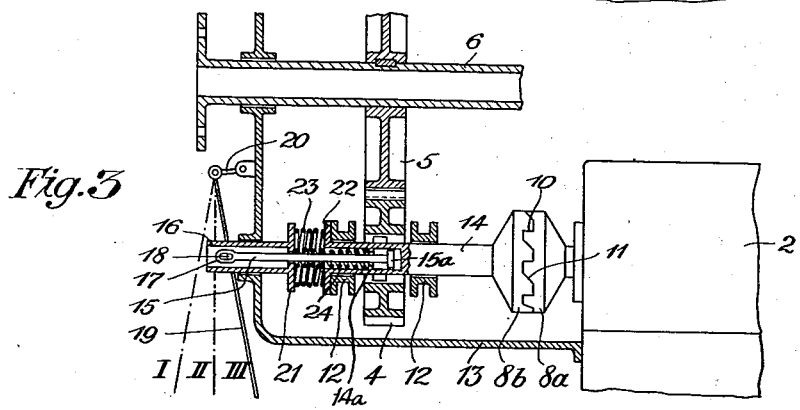

The invention is illustratively exemplified in the accompanying drawing in which Figs. 1, 2 and 3 are diagrammatic sectional views partly in elevation of the clutch coupling between a single motor and a common driven shaft, showing the clutch in three different positions, respectively. Between the motor 2 and its gear wheel 4 is mounted a free wheel clutch 8a, 8b. Each clutch part 8a, 8b is provided with teeth having inclined outer surfaces, side flanks 10 extending parallel to the rotation axis of the coupling and counter flanks 11 inclined to said axis.

The coupling part 8a is fixed to the crank shaft of the motor 2 and rotates in counter-clockwise direction seen from the front side of the motor. The coupling part 8b, on the other hand, is axially slidably mounted in the nave of the gear wheel 4 and is rotated by the coupling part 8a. So long as the coupling part 8a rotates faster than the coupling part 8b, the latter is engaged and rotated by the tooth flanks 10. As soon as the output decreases because of a disturbance in the motor 2, the gear wheel 4 and with it the coupling part 8b is driven through the gear 5 and the shaft 6 from a second motor (not shown), whilst the driving by the coupling part 8a stops and the same begins to rotate slower than the coupling part 8b. This has again the result that now the main pressure of the coupling teeth is exerted on the inclined flanks 11, and, consequently, the inclination originates an axial shearing stress, by which the coupling teeth and therefore also the coupling parts are pressed from another, and in this manner the coupling is released. The release takes place at a torsional moment which is determined by a step-wise acting spring.

For this purpose, the coupling part 8b is slidably supported in a bearing 12 of a casing 13. The hollow shaft of the coupling part 8b passes axially slidably through and is keyed to the gear wheel 4 engaging the gear wheel 5 of the common driving shaft 6. The gear wheel 4 is prevented from sliding axially in the casing 13. A rod 15 is longitudinally slidably and rotatably disposed in the hollow shaft 14 of the coupling part 8b and passing longitudinally slidably and rotatably through a boss 16. The inner end of rod 15 carries a head 15a. The outer end of the rod 15 is provided with a slot 17, which slot is engaged by a catch pin 18 of an actuating lever 19 extending past the boss 16. The pin 18 passes through a radial bore in the boss 16. The actuating lever 19 is hingedly connected by a short rod 20 to the casing 13. A spring 23 is situated between a flange 21 of the boss 16 and a flange 22 at the end of the coupling shaft 14 and within this spring 23 another spring 24 is mounted around the rod 15 and supported between the flange 21 of an inwardly projecting boss 16 and the flange 14a of the coupling shaft 14.

The indicated arrangement works in the following manner: In the position I shown in Fig. 1 of the actuating lever 19 the pin 18 has pulled the rod 15 completely to the left and the latter by means of the head 15a acting against flange 14a keeps the coupling part 8b out of engagement.

When the actuating lever 19 moves from the position I of Fig. 5 to the position II shown in Fig. 2, the pin 18 causes the boss 16 with the flange 21 to move to the right into the casing 13 and the more strongly compressed spring 23 presses against the flange 22 of the coupling shaft 14 thus causing a movement of said coupling part 8b to the right until the latter, after synchronisation by means of the action of the inclined teeth surfaces 9, engages the coupling part 8a. In this position the spring 24 exerts still no tension and upon the coupling part 8b acts only the tension of the spring 23. This tension is indeed strong enough to assure a certain engagement of both coupling parts, but is not strong enough to prevent the release of the coupling in the above-described manner, whenever the output of the corresponding motor decreases for instance in case of failing of the ignition, deficiency of fuel or the like with respect to the other motors. Therefore, when, during operation, the total efficiency of the driving gear decreases, it is only necessary to adjust the couplings of all the motors to the position shown in Fig. 2, and the disturbance must be found in the motor of which the coupling releases.

When the actuating lever 19 is put in the position III shown in Fig. 3, the boss 16 moves further to the right and the tension of the spring 23 increases. At the same time the flange 21 of the boss presses against the spring 24 and the latter presses against the hollow shaft 14 of the coupling part 8b. The combined pressure of the two springs is now so strong, that the coupling is only allowed to release when the motor 2 is completely stopped, for instance stops suddenly. The other motors are allowed to work further unhindered and the driving of the middle shaft 6 is maintained.

The adjustment of the actuating lever 19 for the couplings takes place from the driver's seat by means of a rod (not shown).

What I claim is:

1. In a driving aggregate, the combination of a driving member, a driven member, a clutch coupling to connect the two members and including a clutch portion connected with the driving member and a clutch portion connected with the driven member, one of said clutch portions being adjustable, means on said clutch portions tending to separate the same when the torque transmitted from the driving member to the driven member becomes negative, an adjustable control sleeve, two concentric springs disposed between said control sleeve and said adjustable clutch portion in such a manner that, upon movement of the control sleeve away from the adjustable clutch portion, one of said springs is put out of action, while upon displacement of the control sleeve towards the adjustable clutch portion both springs operate to resiliently resist separation of said clutch portions from each other, abutments provided on said adjustable clutch portion and control sleeve, respectively, and a shiftable coupling rod extending through said springs, said rod carrying abutments for cooperation with said abutments on the adjustable clutch portion and control sleeve, respectively, in such a manner that the coupling is positively disconnected when the sleeve is moved away from the adjustable clutch portion beyond the position in which one of said springs is put out of action.

2. In a clutch device having a driving member, a driven member coaxial with said driving member, one of said members being axially displaceable relative to the other one, a clutch spring urging said displaceable member in axial direction into engagement with the other member and having one of its ends supported on said displaceable member, means on said members tending to separate the latter when the torque transmitted from the driving member to the driven member becomes negative and a clutch release slide including a portion arranged for positive cooperation with a portion of said displaceable clutch member to withdraw the same, against the action of said spring, from said other member upon adjustment of said clutch release slide to one end position, the combination of an axially slidable spring block supporting the other end of said clutch spring, and an operating lever having means engaging said spring block and said clutch release slide for simultaneous operation thereof.

3. A device as claimed in claim 2, in which said means engaging said spring block and clutch release slide comprises a catch pin carried on said operating lever and extending through a radial bore in said spring block into an axially elongated slot in said clutch release slide.

FRITZ NALLINGER.